United States Patent [19]

Burge et al.

[11] 4,122,205

[45] Oct. 24, 1978

[54] SWEETENING COMPOSITIONS CONTAINING PROTEIN SWEETENERS

[75] Inventors: Malcolm Leonard Ernest Burge, Thatcham; Zdenek Nechutny, Reading, both of England

[73] Assignee: Tate & Lyle Ltd., London, England

[21] Appl. No.: 702,199

[22] Filed: Jul. 2, 1976

[30] Foreign Application Priority Data

Jul. 4, 1975 [GB] United Kingdom ............... 28234/75
Jul. 4, 1975 [GB] United Kingdom ............... 28218/75
Jul. 4, 1975 [GB] United Kingdom ............... 28216/75

[51] Int. Cl.$^2$ ............................................. A23L 1/236
[52] U.S. Cl. .................................. 426/548; 426/656; 426/658; 426/804
[58] Field of Search ............... 426/548, 656, 658, 804

[56] References Cited

U.S. PATENT DOCUMENTS

| 3,667,969 | 6/1972 | Kracauer | 426/548 |
| 3,780,190 | 12/1973 | Kracauer | 426/548 |
| 3,878,184 | 4/1975 | Dabry | 426/548 X |

FOREIGN PATENT DOCUMENTS 1,961,769 6/1971 Fed. Rep. of Germany .......... 426/548

OTHER PUBLICATIONS

Morris, Mfg. Conf., 52(7), (1972), pp. 38, 39 and 116.
The Merck Index, Merck & Co., Inc. (1968), pp. 472, 97.

*Primary Examiner*—Raymond N. Jones
*Assistant Examiner*—Esther M. Kepplinger
*Attorney, Agent, or Firm*—Ostrolenk, Faber, Gerb & Soffen

[57] ABSTRACT

A sweetening composition comprising a protein sweetener together with at least one taste modifier comprising a sweetener selected from L-gulose, D-fucose, xylitol, D-arabitol, lactulose, glucoheptose, D(+)-galactose and its derivative D(+)-galactosamine or a salt thereof, and saccharin possesses enhanced sweetening properties as compared with a composition containing no sweetness modifier; the sweetness profile is more rounded and unpleasant after-tastes are minimized.

19 Claims, No Drawings

SWEETENING COMPOSITIONS CONTAINING PROTEIN SWEETENERS

The present invention relates to compositions which are useful as sweeteners for edible materials.

Although sucrose is still the most widely used sweetening agent, synthetic sweeteners have become increasingly important in recent years.

Saccharin is an example of a commonly used synthetic sweetener. "Saccharin" as used herein is defined to mean saccharin itself and its salts and includes, for example, sodium saccharin, calcium saccharin, potassium saccharin, ammonium saccharin and magnesium saccharin. Saccharin is widely used as a substitute for sugar, but has the disadvantage of having a bitter and metallic after-taste to which, it has been reported, from one quarter to one third of the population is sensitive.

In the past, many additives have been proposed for saccharin compositions in order to eliminate or reduce the after-taste but none has proved really successful or popular. Examples of proposed additives include galactose, gluconodelta-lactone, calcium gluconate, lactose, ribonucleotides, piperazine, pectin, mannitol, maltol, adipic acid and sodium chloride.

Cyclamate sweeteners which have been widely used are at present suspect and possess an unpleasant after-taste.

Naturally occurring protein sweeteners are now of considerable interest. For example, a sweet principle (known as "thaumatin") occurs in the fruit of the tropical plant *Thaumatococcus daniellii* Benth. of the family *Marantaceae* which grows in various parts of tropical Africa. The plant is called Katemfe in Sierra Leone. The fruit is tetrahedral, approximately 4 cm diameter, and contains up to three large black seeds each having a white or light yellow aril at its apex and surrounded by a transparent jelly. The arils are intensely sweet. Thaumatin can be extracted by the procedures described by van der Wel, H., and Loeve, K ["Isolation and Characterisation of Thaumatin I and II - a sweet tasting protein from *Thaumatococcus daniellii* Benth.", Eur. J. Biochem., 31 221-5 (1972)]. A particularly advantageous process using an aluminum salt solution as extractant is described in a copending Application now patent No. 4,011,206.

A sweet principle (known as "monellin") is found in the fruit of the tropical plant *Dioscoreophyllum cumminsii* Diels., of the family *Menispermaceae*. The plant and berries have become known as "Guinea Potato" or "Serendipity Berry". The plant is native to the forests of tropical West Africa and bears grape-like clusters of red berries about ½ inch in diameter; the berries have a tough outer skin enclosing a white sweet-tasting mucilaginous material surrounding the seed. The sweet principle can be extracted from the mucilaginous material using the procedures described in, for example, the papers by J. A. Morris et al. ["Characterisation of Monellin, a Protein that Tastes Sweet", J. Biol. Chem. 248 (2), 534-9 (1973)], or by H. van der Wel ["Isolation and Characterisation of the Sweet Principle of *Dioscoreophyllum cumminsii* (Stapf) Diels"], F.E.B.S. Letters 21 (1), 88–90 (1973).

Thaumatin and monellin are many times sweeter than sucrose, but they have the disadvantage of a delay in perception of the sweet taste, a persistent lingering sweet taste, and a slight after-taste often described as liquorice.

We have surprisingly found various sweeteners can be combined in appropriate amounts with a protein sweetener such as thaumatin or monellin, or a mixture thereof with other sweeteners, to reduce the lingering after-taste of the protein sweetener and, in some cases to improve the taste properties of the added sweetener itself.

According to the present invention we provide a sweetening composition comprising a protein sweetener together with at least one taste modifier comprising a sweetener selected from L-gulose, D-fucose, xylitol, D-arabitol, lactulose, glucoheptose, D(+)-galactose and its derivative D(+)-galactosamine or a salt thereof, and saccharin. The protein sweetener is desirably thaumatin or monellin.

While it is possible that the protein sweeteners such as thaumatin and monellin can be used in some food or pharamceutical products without the further addition of a sweetener as taste modifier where the initial delay in sweetness may be considered a positive advantage, the combination of a protein sweetener and a taste modifier according to this invention provides pleasant and acceptable sweetening compositions which may, in the absence of another sweetener such as saccharin at a significant level of sweetness, be characterised by some delay in sweetness perception, but a very much reduced after-taste and lingering sweetness. Such characteristics may, for example, be considered desirable in such products as "sweet-and-sour"-type products.

However, for most sweetening purposes, it is desirable to completely overcome the delay in sweetness perception by including saccharin which has an immediate sweetness, or by including another sweetener such as sucrose or a cyclamate.

The taste modifiers used according to the present invention have physical and organoleptic properties which make them suitable for inclusion in sweetening compositions.

Many of the carbohydrate modifiers have a distinct sweetness: for example, D-arabitol is less sweet than sucrose, whereas xylitol is approximately as sweet as sucrose. However, the small amounts of modifier present in the composition of the invention provide relatively little sweetness, the sweetness in that case mainly being provided by the protein sweetener, e.g. thaumatin or monellin, and by any other sweetener, such as saccharin or sucrose, present.

The carbohydrate modifiers present slightly increase the calorific value per unit sweetness of the composition of the invention. However, the composition is many times as sweet as sucrose so that much smaller amounts are needed to produce the same sweetening effect as a given amount of sugar, and the caloric intake of the consumer is greatly reduced. Furthermore, D-arabitol has been shown to be virtually non-metabolisable by man and hence has an effective calorific value of near zero. Saccharin, of course, has a virtually negligible calorific value.

The compositions of the invention are thus suitable for incorporation into dietetic foods or diabetic foods.

When the protein sweetener is used in the absence of saccharin, the ratio by weight of carbohydrate modifier to protein sweetener may conveniently be stated with reference to the relative sweetness of the protein sweetener as compared with sucrose. Different protein sweeteners have different degrees of sweetness, and different extracts of the same protein sweetener may also have different degrees of sweetness. The ratio of L-gulose or D-fucose to protein sweetener is desirably from x:350 to x:1750, preferably x:580, where x is the number of times sweeter the protein sweetener is as compared with sucrose at a concentration of 5% by weight as described below; while the ratio of xylitol, D-arabitol, lactulose, glucoheptose, D(+)-galactose or D(+)-galactosamine to protein sweetener is desirably from x:9 to x:55, preferably about x:25, where x is as defined above.

Thus, the ratio by weight of modifier to thaumatin preferably lies within the range from 10:1 to 2:1, advantageously about 6:1 for L-gulose and D-fucose and from 390:1 to 64:1, advantageously about 140:1 for the other carbohydrate sweeteners, using thaumatin with a sweetness approximately 3,500 times that of 5% sucrose. The ratio by weight of modifier to monellin (of sweetness approximately 800 times that of 5% sucrose) preferably lies within the range 2.3:1 to 0.5:1, advantageously about 1.4:1 for L-gulcose and D-fucose and from 89:1 to 15:1, advantageously about 32:1 for the other carbohydrate sweeteners.

The preferred weight ratio of saccharin to protein sweetener ranges from 20:1 to 5:1 for thaumatin and from 5:1 to 1:1 for monellin. Higher levels of thaumatin and monellin may be considered undesirable since at these levels the lingering taste and sweetness is more pronounced, although the reduction of the unpleasant saccharin after-taste is still effected. However in some food or pharamceutical uses, the lingering sweetness and taste of the sweet proteins may be considered a positive advantage. Examples of such products are chewing gum, tooth pastes and mouth washes. In these circumstances the initial sweet taste may be provided by saccharin, the lasting taste by thaumatin or monellin in a ratio in excess of 1:1 and the saccharin after-taste is minimal. At ratios above 20:1 or 5:1, respectively, the reduction of the after-taste is less than is generally required. A particularly advantageously ratio is about 10:1 for thaumatin and 2.5:1 for monellin.

The delay in sweetness perception of the protein sweetener is related to the high molecular weight (approximately 20,000 for thaumatin and approximately 10,000 for monellin), so if an immediate sweetness impact is required the sweetener must be used in combination with an alternative sweetener such as sugar and/or an artificial sweetener such as saccharin or a cyclamate.

It is well known that the practical sweetening power of some alternative sweeteners varies when used in combinations with sugar or other sweeteners in different proportions. The sweetness of saccharin, for example, varies in different sugar/saccharin combinations. Similarly the practical sweetening power of thaumatin varies with the ratio of thaumatin to sugar or saccharin (or alternative sweetener). The most effective combinations have approximately half the sweetness contribution from thaumatin (or monellin) and half from sugar or saccharin or a cyclamate.

Sweetener combinations containing thaumatin or monellin in conjunction with saccharin are particularly advantageous as the bitter after-taste or saccharin is minimised by the developing sweetness of the protein.

The effect of the carbohydrate taste modifiers in such sweetener combinations is to minimise the sweetness duration and the after-taste, to give a more "rounded" sweetness profile to combinations or thaumatin with alternative sweeteners, and to enhance the overall sweetness of the sweetener combination alone.

In compositions in which the protein sweetener and saccharin each contribute about half the total sweetness, a carbohydrate taste modifier is preferably used at a slightly higher level than the level used when the protein sweetener is used alone.

In one preferred embodiment of the present invention, a protein sweetener, especially thaumatin, is used in combination with saccharin and/or a sugar selected from sucrose, glucose, and fructose, and/or a cyclamate, and with one of the carbohydrate sweetness modifiers as defined above (ie. other than saccharin).

The use of sucrose, glucose or fructose is especially desirable and gives compositions with a very pleasant flavor and mouth feel but with a higher calorific value than compositions containing saccharin.

When the quantity of saccharin is reduced and the quantity of thaumatic present is proportionally increased in a composition, we have found that there is an apparent variation in the overall sweetness. It i believed that this is due to the fact that saccharin has an immediate sweetness sensation whereas the sweetness of thaumatin is delayed in perception, so that the properties of a combination depend on the relative impact of the various effects.

We have found that it is a particular advantage of the carbohydrate sweetness modifiers of this invention that their presence in the composition can enable saccharin to be partly or completely replaced by a natural sweetener such as sugar. Thus they make a possible a completely saccharin-free sweetening composition of acceptable organoleptic properties.

We have also found that compositions containing two different carbohydrate sweetness modifiers can exhibit a synergistic effect enabling smaller amounts to be used. Particularly noteworthy combinations are D-arabitol and xylitol; D-galactose and D-fucose; and D-galactose and xylitol.

The compositions according to the present invention are completely soluble in water and may be used in hot or cold food and beverages to give a sweetness equivalent to that of sugar.

The sugar-like quality of compositions containing saccharin may be enhanced by adding other components to the saccharin composition, in particular sodium chloride, e.g. in a weight ratio to saccharin of from 1:10 to 4:10, and/or an alkali metal or alkaline earth metal hydroxide, especially calcium hydroxide, e.g. in a weight ratio to saccharin of from 1:100 to 5:100.

The compositions of the invention are soluble in water and can be used to sweeten edible materials in general, including all kinds of foodstuffs, beverages and pharmaceutical preparations. They may be incorporated into, for example, soft drinks, candies, juices, syrups, squashes, sauces, condiments, salad dressings, frozen desserts such as ice creams and sherberts, icings, gelatin, toothpaste, mouthwashes or chewing gum. For ease of addition and in order to achieve homogeneous distribution at the desired dilution in edible material, the compositions of the invention may be formulated in the conventional manner with solid or liquid non-toxic carrier or diluents. For example, solid compositions may take the form of tablets or powders using edible solid carriers such as malto-dextrins, starch or nutritive proteins (e.g. soy protein); or the composition of the invention may be fixed with sucrose to provide a "fortified" sugar. Liquid compositions may take the form of aqueous solutions or of suspensions in other non-toxic liquids such as aqueous ethanol, glycerol and edible oils, and may be used, for example, for spraying.

For use in domestic applications, particularly as a replacement for sugar in beverage sweetening, it is desirable that the compositions according to the present invention include a bulking agent so that an equivalent sweetness to that provided by, say, a teaspoonful of sugar is provided by an amount which can conveniently be handled. Any suitable soluble and edible material can be used, for example, a carbohydrate such as sucrose itself, especially transformed sugar of low density, dextrose, or sorbitol or a dextrin such as spray-dried maltodextrin. While the substances will add signficantly to the caloric value of the composition, the total will still be considerably smaller than that of the amount of sugar providing an equivalent sweetness. Alternatively, the sweetening composition may be prepared in a tablet form.

The sugars useful as taste modifiers do possess some sweetness in their own right. However, the comparative sweetness of the protein sweetener and/or saccharin in the composition is very much higher and thus, at the levels proposed, and sugar taste modifiers do not significantly contribute to the sweetness of the product.

The sweetening properties of protein sweeteners such as thaumatin and monellin are liable to be affected by heat. Some preparations of thaumatin and monellin suffer from loss of sweetness on heating to temperatures above 70° C. for prolonged periods. When a composition of the invention is incorporated into a food or beverage whose preparation involves heating, it is desirable to add it after heating is complete so as to avoid loss of sweetness.

Compositions of the invention are usually stable at pH values in the range of from 2 to 10, especially 3 to 8. Dry compositions, such as powders, granules or tablets are stable indefintely when stored under dry conditions at room temperature. Compositions in the form of aqueous solutions are stable indefinitely when frozen. If a preservative such as benzoic acid or its salts, sulphur dioxide or sodium metabisulphite is added to such a composition, it may be stored almost indefinitely at room temperature. The composition therefore has a long shelf life when incorporated into soft drinks or fruit juices, or other similar food compositions containing preservatives.

Thaumatin, monellin, saccharin and cyclamates are much sweeter that sugar, have practically no calorific value compared with the equivalent sweetness of sugar and are, in general, cheaper to produce than sugar, so that the compositions of the invention need not be expensive. They have a better sweetness and taste than the individual sweeteners alone, do not impair the flavour of edible materials in which they are incorporated and in some cases can produce a slightly sustained sweetness sensation which is pleasant and is sometimes preferable to that of sucrose, where there is no such sustained sweetness.

The sweetness intensity of compositions according to the present invention and of their ingredients was evaluated by a panel of experienced tasters against sucrose as standard. Each material whose sweetness was to be evaluated was dissolved in water at a neutral pH value to give a range of solutions each of different concentration, and the panel was asked to match the sweetness of the resulting solutions to that of a standard sugar solution.

The panel was asked to compare solution of xylitol having a range of concentrations with 2% and 5% solutions of sucrose. They assessed the sweetness of xylitol as about equal to that of sucrose.

The panel was asked to compare the sweetness of a range of sodium saccharin solutions of different concentrations with that of 2% and 5% solutions of sucrose. They assessed the sweetness of sodium saccharin as 510 times that of sucrose when the 2% sucrose solution was used as standard and 410 times that of sucrose when the 5% sucrose solution was used as standard. This result is in accordance with the known decrease in the relative sweetness of saccharin with increasing concentration (Schutz and Pilgram, Food Research, March–April 1957, "Sweetness of various compounds and its measurement").

The thaumatin used also showed a decrease in relative sweetness with increasing concentration, although the decrease was not as pronounced as that of saccharin. When solutions of thaumatin were assessed against a 5% solution of sucrose, the panel assessed the sweetness of thaumatin as 3,500 times that of sucrose. When the solutions were assessed against a 15% solution of sucrose, the panel assessed the sweetness of thaumatin as 1,800 times that of sucrose.

When a composition containing saccharin and thaumatin is dissolved in water, the apparent sweetness of the solution is less than would be expected if the sweetness contribution of the saccharin and the thaumatin were additive. A sweetening composition was prepared by mixing together 1 parts by weight of thaumatin and 10 parts by weight of sodium saccharin, and used to prepared a range of aqueous solutions each of different concentration. The panel assessed the sweetness of the composition as 550 times that of sucrose when the 5% solution of sucrose was used as standard. If the sweetness of the constituents had been directly additive, a sweetness 691 times that of sucrose would have been expected when a 5% sucrose solution was used as standard. One possible reason for this apparent loss in sweetness, as explained above, is that saccharin gives rise to an immediate sweetness of short duration, whereas thaumatin gives rise to a delayed and lingering sweetness. The maximum sweetness sensation of the two substances is perceived at different times so that the combined sweetness appears to be less than the sum of the sweetnesses of the individual substances.

The duration of the sweetness sensation is not usually significant when the relative sweetness of sucrose and artificial sweeteners, e.g. saccharin, or cyclamates are compared because the sensation of sweetness is usually of very short duration. However, we have found that duration is important in evaluating the sweetness of protein sweeteners such as thaumatin and monellin, where the lingering sweetness is significant. It is difficult to determine the precise relationship of the time of maximum perceived sweetness and the duration of the perceived sweetness.

In some sweetening compositions comprising saccharin and thaumatin or monellin, a double peak of sweetness may be detected. We have found that the addition of a carbohydrate modifier such as xylitol to the composition according to the invention produces a single broad peak of sweetness. Furthermore, the sweetness of the composition according to the invention was greater than would have been expected if the sweetnesses of the modifier, e.g. xylitol, thaumatin and sodium saccharin were merely additive.

The invention is illustrated by the following Examples.

EXAMPLE 1

A sweetening composition suitable for incorporation into low-calorie foods and drinks was prepared by mixing together the following ingredients (parts by weight):

| | |
|---|---|
| xylitol | 140 |
| thaumatin | 1 |
| sodium saccharin (Sigma Chemical Company) | 10 |

The panel assessed the sweetness of the composition as 64 times that of sucrose when a 5% sucrose solution was used as standard. If the sweetnesses of the xylitol and the saccharin/thaumatin mixture had been merely additive, a sweetness of 41 times that of sucrose would have been expected using a 5% sucrose solution.

EXAMPLE 2

A sweetening composition was prepared by mixing together the following ingredients (parts by weight):

| | |
|---|---|
| D-arabitol | 1.0 |
| monellin | 0.04 |
| sodium saccharin | 0.10 |

1.14 parts by weight of the resulting compositions had about the same sweetness as 75 parts by weight of sugar.

EXAMPLE 3

A sweetening composition was prepared by mixing together the following ingredients:

| | | |
|---|---|---|
| xylitol | 9.8 | g |
| thaumatin | 0.07 | g |
| sodium saccharin | 0.35 | g |
| sugar | 164 | g |

The composition was dissolved in 1 litre of bottling syrup as described in Example 4 which was then diluted with water in a ratio of 1:4.9 to form a soft drink.

EXAMPLE 4

Evaluation for use in soft drinks

Compositions according to the invention were incorporated into a carbonated lemonade soft drink and were submitted to a panel of tasters of comparison with a similar soft drink in which sugar and saccharin are used as sweetener. The members of the panel were selected irrespective of whether they normally drank lemonade. A "control" drink intended to be similar to commercially available lemonade was prepared by mixing together the following ingredients (g per litre except where otherwise stated):

| | |
|---|---|
| sucrose | 425 |
| sodium saccharin (equivalent to 175 g per liter of sucrose) | 0.32 |
| benzoic acid | 800 ppm |
| acidity (% w/v calculated as citric acid based on the weight of syrup | 1.1% |
| essence of lemon | 4.6 |

A 170 ml portion of the above bottling syrup was diluted to a volume of 1 litre with carbonated water to form a soft drink which was then bottled.

Compositions according to the invention were prepared as follows using the same proportions of flavouring agent, preservative and acidity but using different sweetners:

(a) LOW CALORIE DRINK

A soft drink was prepared by the same method as the "control" drink except that the sucrose and saccharin were replaced by the following:

| | | |
|---|---|---|
| xylitol | 9.8 | g |
| thaumatin | 0.07 | g |
| saccharin | 0.7 | g |

(b) REDUCED CALORIE DRINK

The same method was used as for the low calorie drink but with the following composition:

| | | |
|---|---|---|
| D-arabitol | 9.8 | g |
| thaumatin | 0.07 | g |
| saccharin | 0.3 | g |
| sucrose | 164 | g |

The members of the panel were requested to taste drinks (a) and (b) and the control drink and then to give their comments on each drink and to evaluate it using the following scale:

| | |
|---|---|
| like extremely | 9 |
| like very much | 8 |
| like moderately | 7 |
| like slightly | 6 |
| neither like or dislike | 5 |
| dislike slightly | 4 |
| dislike moderately | 3 |
| dislike very much | 2 |
| dislike extremely | 1 |

The results of the evaluation were as follows:

Table 1

| Sample | Mean Score | Range of Scores |
|---|---|---|
| Control | 6.5 | 4 – 8 |
| (a) | 5.8 | 4 – 8 |
| (b) | 6.9 | 5 – 8 |

There are no visible difference between any of the above drinks and the members of the panel considered that they all had a generally similar sweetness. The panel commented favourably on the slight time lag in full sweetness development in the drinks (a) and (b). The members of the panel preferred the reduced calorie drink (b) to the control drink, whereas the minimum sugar drink was assessed as similar to the control.

Although the low calorie drink (a) was not really comparable with the sugar-containing drinks, it received a surprisingly high acceptability rating. The panel considered that the product was palatable and considerably better than previously available low calorie drinks. Only a few soft drinks of this type are commercially available and they are normally considered to taste decidely inferior to sucrose-containing drinks. The acceptability rating of drink (a) could be further improved by addition of non-calorific thickeners and incorporation of additional carbon dioxide to improve its body and mouth feel, respectively.

EXAMPLES 5 TO 7

Compositions containing monellin, saccharin and D-arabitol or xylitol were prepared as indicated in the following Table:

Table 2

| Example | | Parts by weight (a) | Parts by weight (b) |
|---|---|---|---|
| Monellin | | 0.04 | 0.06 |
| Saccharin | | 0.10 | 0.06 |
| D-arabitol | 5 | 1.0 | |
| Xylitol | 6 | 1.0 | |
| D-arabitol | | 0.9 | 0.9 |
| Xylitol | 7 | 0.02 | 0.06 |

All compositions had essentially the same taste response. Example 7 shows the synergism obtained by using the two modifiers, namely D-arabitol and xylitol: 0.92 parts of a mixture is equivalent to 1.0 parts of either modifier alone.

EXAMPLES 8 AND 9

Compositions containing thaumatin, cyclamate and D-arabitol or xylitol were prepared as indicated in the following Table:

Table 3

| | Example | |
|---|---|---|
| Thaumatin | | 0.01 |
| Na cyclamate | | 1.40 |
| D-arabitol | 8 | 1.4 |
| Xylitol | 9 | 1.4 |

The compositions had essentially the same sweetness as those of Examples 5 to 7.

EXAMPLES 10 TO 16

Sweetening compositions suitable for incorporation into low-calorie foods and drinks were prepared by mixing together thaumatin and a sweetness modifier according to the present invention. Two series of compositions were prepared, referred to as series (a) and (b).

Table 4

| | Example | (a) | (b) |
|---|---|---|---|
| Thaumatin[1] | | 0.02 | 0.01 |
| | 10–16 | | |
| Saccharin[2] | | — | 0.10 |
| L-gulose | 10 | 0.1 | 0.05 |
| D-fucose | 11 | 0.1 | 0.05 |
| lactulose | 12 | 1.4 | 0.8 |
| glucoheptose | 13 | 1.4 | 0.8 |
| D(+)-galactose | 14 | 1.4 | 0.8 |
| D(+)-galactosamine | 15 | 1.4 | 0.8 |
| D-galactose | | — | 0.4 |
| | 16 | | |
| D-fucose | | — | 0.01 |

[1]The thaumatin preparation used was evaluated at a sweetness (measured in the absence of modifiers) of approximately 3,500 × sucrose (measured at a 5% level). The amount of thaumatin used can be varied *pro rata* for weaker or stronger extracts.
[2]Sodium saccharin was used; the free acid or other salts may be substituted.

All of the Examples in each series (a) and (b) give solutions of approximately equal sweetness.

Examples 16 illustrates the synergism obtained by the use of a mixture of two sweeteners modifiers, namely D-galactose and D-fucose. A total of 0.41 parts by weight a mixture had the same effect in the composition as 0.8 of parts by weight of D-galactose alone in series (b). In the substitution in series (b), the amount of D-galactose used was 50% of that needed alone and the amount of D-fucose was 20% of that needed alone, giving a total modifier content of only 70% of that used singly.

EXAMPLE 17

A composition similar to that of Example 10b was prepared except that the saccharin content was employed by an equivalent amount of sucrose. The composition is summarised in Table 5.

Table 5

| Example | 17 |
|---|---|
| Thaumatin[1] | 0.01 |
| Sucrose | 36 |
| (a) L-gulose or D-fucose | 0.05 |
| (b) D-galactose or D-galactosamine | 0.8 |

[1]as for Table 4

These results may be taken to indicate that when thaumatin contributes 50% or more of the sweetness of the composition, saccharin may be wholly or partly replaced by sugar. Essentially the same taste response was found with the composition of Example 17 as with the compositions of Examples 10 and 15.

The composition of Example 17 may be used in soft drinks or other food compositions.

EXAMPLE 18

A composition similar to that of Example 14 was prepared containing sodium cyclamate 1.4 parts in place of sodium saccharin 0.1 parts.

EXAMPLE 19

A bulked sweetener possessing the same sweetness as an equal volume of sugar was prepared by mixing the following ingredients:

| malto-dextrin (bulk density of 0.2 g/cc) | 222.2 g |
|---|---|
| sodium saccharin | 5.1 g |
| thaumatin | 0.5 g |

The resulting composition has a sweetening power equivalent to that of approximately 4 kilograms of sugar.

EXAMPLE 20

A similar bulked sweetener to that of Example 19 may be prepared using 2.0 g of monellin in place of the thaumatin.

EXAMPLE 21

Granular sweetener

The following ingredients were mixed uniformly:

| sodium saccharin | 100 | g |
|---|---|---|
| thaumatin | 10 | g |
| sodium chloride | 26.7 | g |
| calcium hydroxide | 2.3 | g |
| sugar | 3,000 | g |

The mixture was wet granulated using about 1 to 2% of 50% aqueous alcohol. After drying and sifting, a granular product was obtained having a sweetening power approximately 25 times that of sugar.

EXAMPLE 22

The following ingredients were uniformly mixed:

| | | |
|---|---|---|
| sodium saccharin | 100 | g |
| monellin | 20 | g |
| sodium chloride | 26.7 | g |
| calcium hydroxide | 2 | g |

The above mixture was a sweetening power of approximately 400 times that of sugar.

We claim:

1. A sweetening composition comprising a protein sweetener selected from the group consisting of thaumatin and monellin together with a protein sweetener after-taste reducing amount at which there is no significant contribution to the sweetness of the composition of at least one modifier selected from the group consisting of L-gulose, D-fucose, xylitol, D-arabitol, lactulose, glucoheptose, D(+)-galactose, D(+)-galactosamine or salt thereof.

2. A composition according to claim 1 in which the ratio by weight of L-gulose or D-fucose to protein sweetener is from about x:350 to about x:1750, where x is the number of times sweeter the protein sweetener is as compared with sucrose at a concentration of 5% by weight.

3. A composition according to claim 2 in which the ratio by weight of L-gulose or D-fucose is about x:580.

4. A composition according to claim 1 in which the ratio by weight of xylitol, D-arabitol, lactulose, glucoheptose, D(+)-galactose or D(+)-galactosamine to protein sweetener is from about x:9 to about x:55 where x is as defined in claim 3.

5. A composition according to claim 4 in which the ratio by weight is about x:25.

6. A composition according to claim 1 containing a protein sweetener selected from the group consisting of thaumatin and monellin in combination with at least one sweetener selected from the group consisting of sucrose, glucose, fructose, and a cyclamate and with a protein sweetener after-taste reducing amount at which there is no significant contribution to the sweetness of the composition of at least one modifier selected from the group consisting of L-gulose, D-fucose, xylitol, D-arabitol, lactulose, glucoheptose, D(+)-galactose, D(+)-galactosamine or a salt thereof.

7. A composition according to claim 1 containing a combination of two modifiers.

8. A composition according to claim 7 containing D-arabitol and xylitol.

9. A composition according to claim 7 containing D-galactose and D-fucose.

10. A composition according to claim 7 containing D-galactose and xylitol.

11. A composition according to claim 1 containing a protein sweetener selected from the group consisting of thaumatin and monellin in combination with saccharin and with a protein sweetener after-taste reducing amount at which there is no significant contribution to the sweetness of the composition of at least one modifier selected from the group consisting of L-gulose, D-fucose, D-arabitol, lactulose, glucoheptose, D(+)-galactosamine or a salt thereof.

12. A composition according to claim 11 further containing saccharin together with an auxiliary modifier selected from the group consisting of sodium chloride, an alkali metal hydroxide and an alkaline earth metal hydroxide.

13. A composition according to claim 12 containing sodium chloride and saccharin in a weight ratio of from 1:10 to 4:10.

14. A composition according to claim 12 containing calcium hydroxide and saccharin in a weight ratio of from 1:100 to 5:100.

15. A composition according to claim 1 further containing a bulking agent.

16. A food product or beverage containing a sweetening composition comprising a protein sweetener selected from the group consisting of thaumatin and monellin together with a protein sweetener after-taste reducing amount at which there is no significant contribution to the sweetness of the composition of at least one modifier selected from the group consisting of L-gulose, D-fucose, xylitol, D-arabitol, lactulose, glucoheptose, D(+)-galactose, D(+)-galactosamine or a salt thereof.

17. A composition according to claim 6 in which the sweetener is sucrose.

18. A composition according to claim 6 in which the sweetener is glucose.

19. The composition according to claim 6 in which the sweetener is fructose.

* * * * *